United States Patent [19]
Kusek

[11] Patent Number: 5,344,604
[45] Date of Patent: Sep. 6, 1994

[54] PROCESS FOR FORMING A SUBSTANTIALLY GAS FREE ENCAPSULATION

[76] Inventor: Walter K. Kusek, 2925 Aran Ct., Oakton, Va. 22124

[21] Appl. No.: 46,125

[22] Filed: Apr. 12, 1993

Related U.S. Application Data

[63] Continuation of Ser. No. 814,143, Dec. 27, 1991, abandoned.

[51] Int. Cl.$^5$ .................. B29C 45/02; B29C 45/14
[52] U.S. Cl. ......................... 264/272.11; 264/328.17
[58] Field of Search ............... 264/328.5, 102, 272.11, 264/272.17, 328.4, 328.17

[56] References Cited

U.S. PATENT DOCUMENTS

| | | | |
|---|---|---|---|
| 3,499,955 | 3/1970 | Shannon | 264/102 |
| 3,608,023 | 9/1971 | Scarlborough | 264/102 |
| 3,621,892 | 11/1971 | Gillepsie | 264/102 |
| 4,374,080 | 2/1983 | Schroeder | 264/102 |
| 4,439,386 | 3/1984 | Antczak | 264/102 |
| 4,569,814 | 2/1986 | Chong et al. | 264/328.5 |
| 4,681,718 | 7/1987 | Oldham | 264/102 |

FOREIGN PATENT DOCUMENTS

| | | | |
|---|---|---|---|
| 61-85830 | 5/1986 | Japan | 264/328.5 |
| 63-28612 | 2/1988 | Japan | 264/272.17 |

Primary Examiner—Jan H. Silbaugh
Assistant Examiner—A. Y. Ortiz
Attorney, Agent, or Firm—Hardaway Law Firm

[57] ABSTRACT

A process of forming an article wherein a resinous material is heated to a first temperature sufficient to release substantially all sorbed gases and to form a substantially gas free, clay-like precursor material. The precursor material is stored indefinitely prior to producing the material into a desired configuration and heating the formed material to cure such material into a stable solid configuration.

8 Claims, 1 Drawing Sheet

PROCESS FOR FORMING A SUBSTANTIALLY GAS FREE ENCAPSULATION

This application is a continuation, of application Ser. No. 07/814,143, filed Dec. 27, 1991, now abandoned.

BACKGROUND OF THE INVENTION

This invention relates generally to the art of electronics and more particularly to the formation of a substantially gas and void free encapsulation for electronic components.

U.S. Pat. No. 4,826,932 to Sakai, et al. describes a resin molding tablet for use in resin molding semi-conductor devices in a tablet form. The tablet is formed of powdered or particulate resin wherein the particles are compacted so as to densify the particles and hopefully, removed sorbed gases therefrom. The tablets are subsequently melted and molded to form an encapsulation on an integrated circuit device.

The description set forth in the Sakai, et al. patent is substantially a description of the prior art which this invention supersedes and which is hereby incorporated by reference.

SUMMARY OF THE INVENTION

It is thus an object of this invention to provide a novel process of forming an article.

It is a further and more particular object of this invention to provide a process of forming an encapsulated material which is substantially free of sorbed gases.

It is a yet further and more particular object of this invention to provide a process for forming an encapsulating material wherein the precursor material is in a semi-solid state.

These as well as other objects are accomplished by a process of forming an article wherein a resinous material is heated to a first temperature sufficient to release substantially all sorbed gases and to form a substantially gas free precursor material. The precursor material is stored indefinitely prior to forming the precursor into a desired configuration and heating the formed material to cure the material into a stable solid configuration.

BRIEF DESCRIPTION OF THE DRAWINGS

The FIGURE is a flow chart of the process of forming an encapsulation.

DETAILED DESCRIPTION

Figure 1:
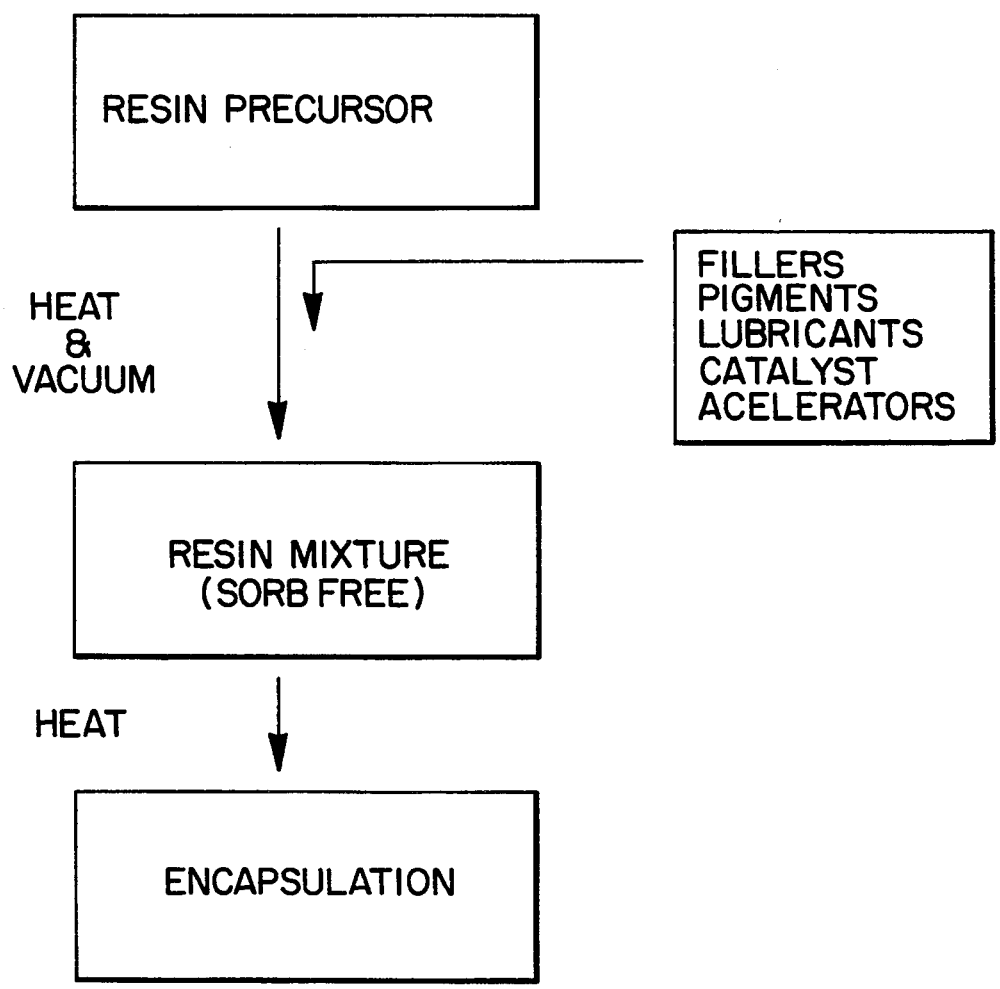

In accordance with this invention it has been found that by using a resin in a precursor semi-solid state that many of the problems associated with sorbed gases may be eliminated. It has especially been found in accordance with this invention when a resinous material is utilized in the tablet form, there is always residual gas present which causes degradation of any encapsulated electronic component due to the presence of such sorbed gases. In accordance with this invention, the term sorbed is meant to be inclusive of attachment processes such as absorption, adsorption, intersticial lodgement as well as hydration.

In accordance with this invention, a resinous semi-solid material is utilized to form a precursor for the formation of an eventual solid formed electronic encapsulation. The resinous semi-solid material of this invention has a consistency similar to that of ordinary modelling clay. The resinous material is frequently mixed with one or more substantially inert fillers so as to provide an aggregate for the eventual set and cured resinous material. In addition to fillers, the resinous material may also be mixed with pigments, lubricants, and/or catalysts.

As seen in the flow chart of the FIGURE, the resinous precursor material is heated to a first temperature sufficient to release substantially all sorbed gases and form a substantially gas free precursor material. This heating step is carried out generally for a period of from ten minutes to about three hours and may have substantially reduced pressure to assist in releasing and removing all sorbed gases. The temperature of this heating step may be carried out from about 150° F. to 400° F. and more preferably from 212° F. to 400° F. under a vacuum of 700 to 760 mm of mercury while simultaneously mixing the resinous material with an inert filler. An inert filler may be present in an amount from about 60 to 80% of the final composition.

The precursor material thus formed is stable at room temperature in a sealed container for long periods of time. The material is highly flowable at low processing temperatures of between 95° to 120° F. The flowable material is readily used in transfer, compression, or injection molding technology to form desired encapsulated configurations. Upon obtaining the desired configuration, the configured material is heated to a curing temperature which generally is in the range of 250° to 400° F.

A significant advantage of the material of this invention is its inherent softness which permits it to be injected or transferred at temperatures well below its reactivity temperature, rather than at higher temperatures where the prior art materials have shown a tendency to become unstable.

It is also possible to add an accelerator to the precursor material and storing the resultant mix for six months to one year in a sealed container before the encapsulation step is carried out.

While this invention may be carried out with many resinous materials, particularly useful resinous materials include epoxies, diallyl phthalate (DAP) and polyesters. Filler materials may include silica glass microspheres, fused quartz, glass fibers, aluminum trihydrate, calcium carbonate, talc and mica as well as combinations of the above.

It is preferred to mix the filler material with the resinous material during the heating and vacuum step in the formation of the precursor. Most thermo-set material such as epoxy, polyester, DAP, etc. have a significant drop in viscosity upon heating so that mixing at the elevated temperature not only is enhanced but entrapped air and volatiles are easily extracted. It is also preferred that filler material and other additives be raised to the release temperature of the resin prior to mixing so as to release sorbed gases associated with the additive material prior to mixing with the resinous precursor.

It is preferred that the heating step be carried out at a temperature which is above the final molding temperature so that all gases that can be released at the temperature of molding had been released prior to the molding step. It is this release of undesired gases that causes a breakdown in electronic components. The electronic components of which this invention is applicable may be conventional integrated circuits or other active devices but may be a conventional capacitor or other passive electrical device where the quality of the encapsulation material is critical to stable performance of the device.

The advantages of the present invention is that the clay-like material used as the encapsulant is virtually void free, volatile free and stable at room temperature for extended storage e.g. six months or greater. The semi-solid nature of the material coupled with its inherent softness allows for lower temperature processing which maintains the desireable sorbed-free state. Further, the resinous material may be mixed with a variety of fillers or desired pigments while maintaining its long term storage capabilities.

It is thus seen that the process of this invention provides a novel encapsulation material. It is further seen that this invention provides an encapsulation material which had removed therefrom substantially all sorbed gases. As the above description is exemplary in nature, many variations will become apparent to those of skill in the art. Such variations however, are embodied within the spirit and scope of this invention as defined by the following appended claims.

That which is claimed:

1. A process for forming an article, comprising the steps of:
   heating a resinous precursor semisolid flowable material to a first temperature sufficient to release substantially all sorbed gases and to form a substantially gas free precursor material;
   storing said precursor material at room temperature while still retaining said semisolid flowable and gas free state, said material having the ability to maintain said state for up to six months of storage;
   forming said semisolid flowable and gas free precursor material into an electrical encapsulation configuration; and
   heating the formed material to a cure temperature, said material forming a stable solid electrical encapsulation configuration upon curing.

2. The process according to claim 1 wherein said resinous material additionally includes an inert filler.

3. The process according to claim 1 wherein said resinous material additionally includes a plurality of inert filler materials.

4. The process according to claim 1 wherein said resinous material additionally includes an accelerator.

5. The process according to claim 1 further comprising the step of simultaneously reducing the pressure in the atmosphere adjacent said resinous material during said step of heating to assist in removing said sorbed gases.

6. The process according to claim 1 further including the step of mixing a substantially inert filler with said resinous material prior to forming said substantially gas free precursor material.

7. The process according to claim 1 wherein said formed material is an encapsulation for an integrated circuit.

8. The process according to claim 1 wherein said formed material is an encapsulation for an electrical circuit.

* * * * *